Sept. 24, 1957 S. C. PELLEGRINO 2,807,304
ADJUSTABLE TREAD FOR WHEEL AND TIRE ASSEMBLIES
Filed March 2, 1956 2 Sheets-Sheet 1
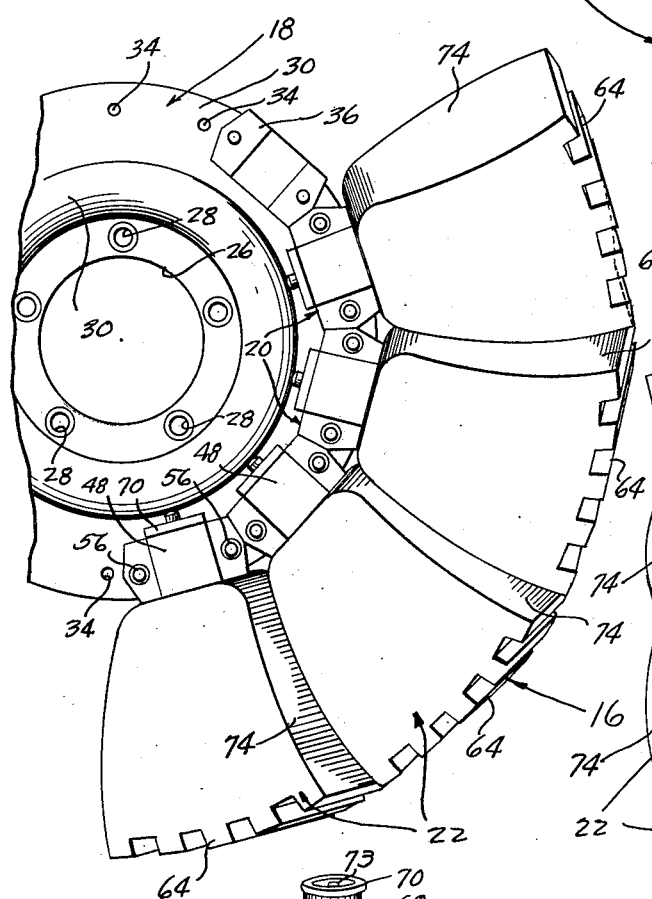
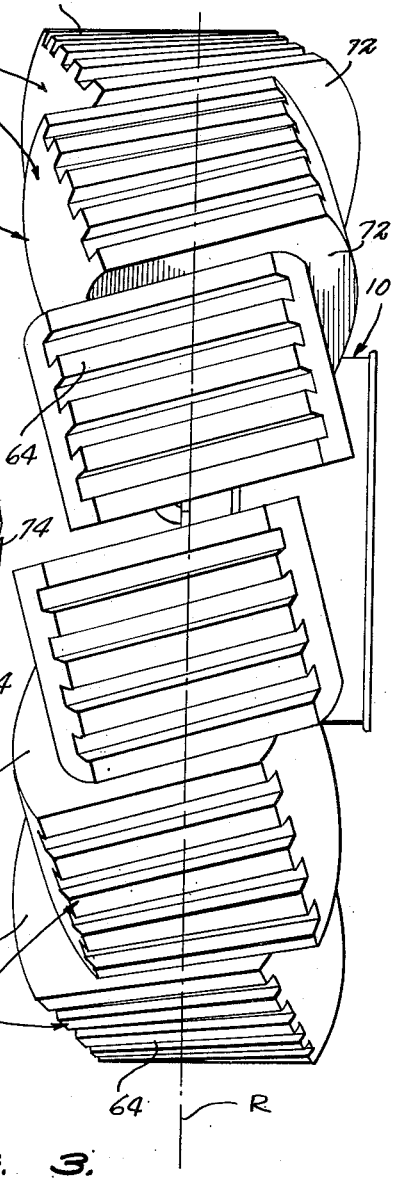
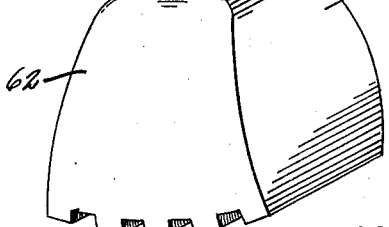
INVENTOR.
SAMUEL C. PELLEGRINO,
BY
McMorrow, Berman + Davidson
ATTORNEYS.

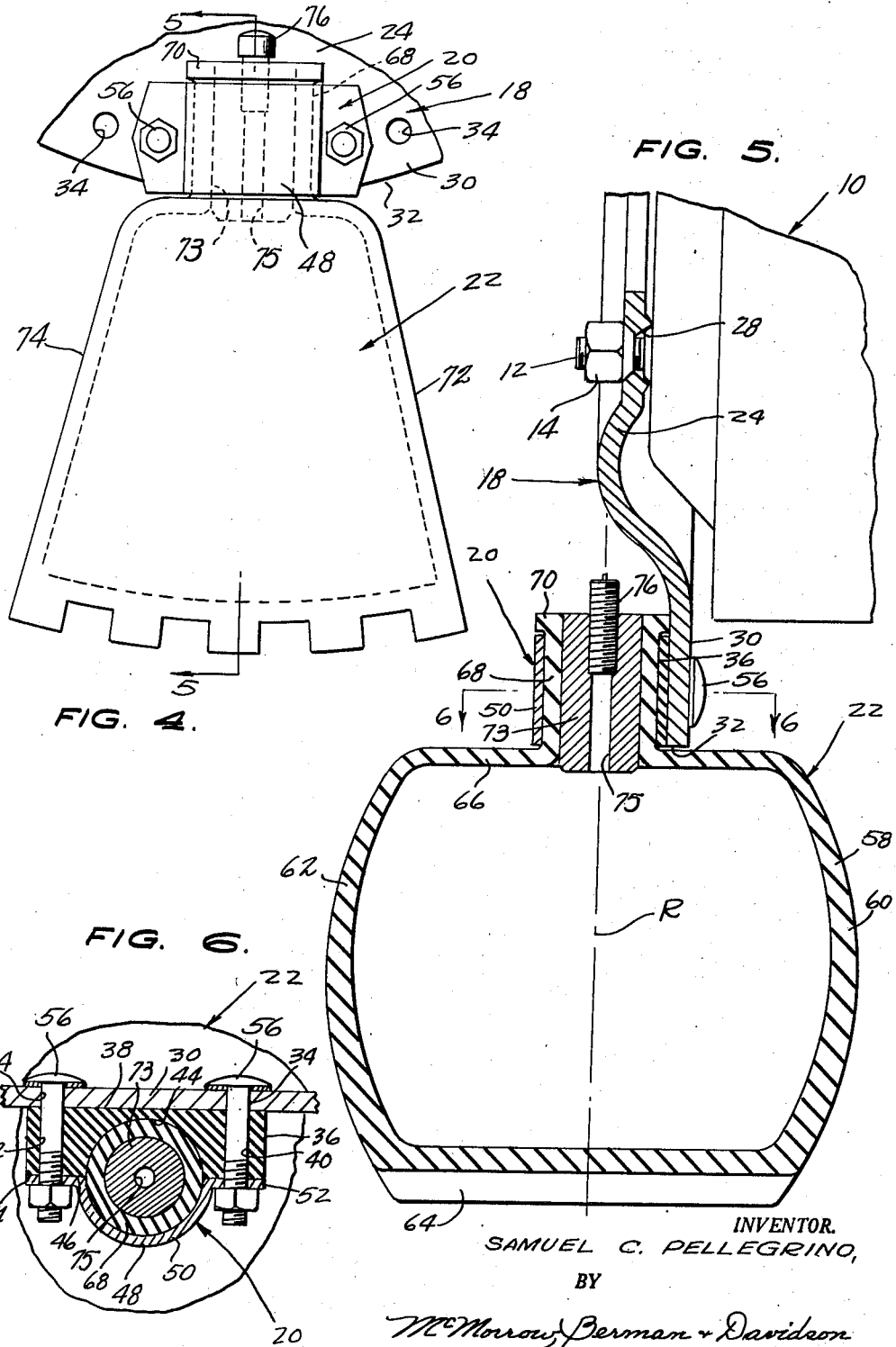

United States Patent Office 2,807,304
Patented Sept. 24, 1957

2,807,304

ADJUSTABLE TREAD FOR WHEEL AND TIRE ASSEMBLIES

Samuel C. Pellegrino, Buffalo, N. Y.

Application March 2, 1956, Serial No. 569,165

6 Claims. (Cl. 152—208)

This invention relates generally to wheel and tire assemblies and is more particularly concerned with an improved wheel and tire assembly incorporating an adjustable tread useable for different road conditions such as snow, mud, and the like.

A primary object of invention is to provide a novel wheel and tire assembly providing an adjustable transverse tread portion, the wheel and tire assembly including a mounting member securable on the axle portion of the vehicle, a plurality of radially disposed clamp assemblies secured in equidistant radial relationship on the radial plane of the wheel and tire assembly, said clamp assemblies rotatably supporting radially disposed spaced tire segment elements including an arcuate crown portion defining an annular bearing surface portion, the tire segment elements including adjacent side edge portions defining transverse tread portions adjustable in angular relationship relative to the radial plane of the wheel and tire assembly.

Further objects of invention in conformance with that set forth reside in details of the tire segment elements and clamp assemblies of the novel wheel and tire assembly.

Another object of invention in conformance with that set forth is to provide a novel wheel and tire assembly of the character set forth which is readily and economically manufactured, easily installed, adjusted and maintained, and highly practical, serviceable, and acceptable for the purpose intended.

These together with other objects and advantages which will subsequently become apparent reside in the details of construction and operation as more fully hereinafter described and claimed, reference being had to the accompanying drawings forming a part hereof, wherein like numerals refer to like parts throughout, and in which:

Figure 1 is a fragmentary side elevational view of the novel wheel and tire assembly;

Figure 2 is an end elevational view of the novel wheel and tire assembly, illustrating the adjustable transverse tread portions thereof;

Figure 3 is a perspective view of a tire segment element of the novel assembly;

Figure 4 is an enlarged fragmentary elevational view of one of the tire segment elements of the novel assembly;

Figure 5 is a sectional view taken substantially on line 5—5 of Figure 4, showing a portion of the mounting hub on which the novel wheel and tire assembly is mounted; and Figure 6 is a fragmentary sectional view taken substantially on line 6—6 of Figure 5.

Referring to the drawings in detail, indicated generally at 10 is a conventional vehicle wheel hub which may comprise a portion of the brake drum of the vehicle and which will have extending laterally therefrom a plurality of wheel mounting studs 12, see Figure 5, engageable with mounting nuts 14 in a conventional manner. The novel wheel and tire assembly incorporating an adjustable transverse tread portion is indicated generally at 16, said assembly 16 including a mounting member 18, a plurality of clamp assemblies indicated generally at 20, and a plurality of tire segment elements indicated generally at 22.

The mounting member 18 comprises an annular plate member including a body portion 24 having a central transverse aperture portion 26 permitting the wheel axle to be extended centrally therethrough, and includes a plurality of uniformly disposed aperture portions 28 for receiving therethrough the mounting studs 12 of the wheel hub 10. The body member 24 terminates in an offset outer annular flange portion 30, see Figure 5, which has extending therethrough adjacent the edge portion 32 thereof pairs of radially disposed equidistantly spaced aperture portions 34 which are utilized for mounting the clamp assemblies 20 in equidistant radially disposed relationship about said mounting member 18 in substantial alignment with the radial plane R of the novel wheel and tire assembly, said radial plane being that which extends centrally through the center of the wheel and tire assembly normal to the axis of rotation of said assembly.

The clamp assemblies 20 comprise a clamp block element 36 which includes the surface portion 38 juxtaposed on the portion 30 of the mounting member 18, see Figure 6, and including transverse bore portions 40 and 42 alignable with the aperture portions 34 and portion 30 of the mounting member 18. The clamp block element 36 includes a concave notch 44 extending into the surface portion 46 opposite that portion 38 which is juxtaposed on portion 30 of the mounting member 18, and which normally will be disposed on one side of a mounting shaft of the tire segment elements as subsequently will be described. The clamp assemblies 20 include a clamp strap element 48 which includes an intermediate arcuate portion 50 disposable on the opposite side of the mounting shaft portion of the tire segment elements as will also be subsequently described, the portion 50 terminating in mounting ear portions 52 and 54 which are transversely apertured for alignment with an aperture portion 34 and bore portion 40, and an aperture 34 and a bore portion 42 in the mounting member 18 and the clamp block element 36 as clearly seen in Figure 6. Extending through the aligned aperture portions 34, 40 and 52, and 34, 42 and 54, are nut and bolt assemblies 56 which may be tightened for retaining the tire segment elements in a particular position of adjustment and loosened for permitting various positions of adjustment relative to the radial plane of the wheel and tire assembly.

The tire segment elements 22 include a hollow inflatable body portion 58 which includes arcuate side wall portions 60 and 62 molded integral with an arcuate crown portion 64 which may have a plurality of transverse tread portions formed therein, if desired, and including an inner or bottom portion 66 incorporating thereon a centrally located integral tubular stem or mounting shaft portion 68 which terminates in an annular flange portion 70. The side wall portions 60 and 62, the crown portion 64 and the bottom portion 66 of the tire segments are integrally formed with oppositely disposed angular end walls 72 and 74 which radiate toward the axis of rotation of the wheel and tire assembly, and as clearly seen in Figures 1 and 2 the end walls 72 and 74 of adjacent tire segment elements are disposed in spaced relationship defining a transverse tread on the tire assemblies. The arcuate crown portions 64 of the respective tire segment elements combine to define an annular bearing surface portion of the novel assembly.

The tubular mounting shaft portion 68 of the tire segment elements is received between the clamping block element 36 and the clamp strap element 48 being retained therein by means of the nut and bolt assemblies 56 in substantially longitudinal alignment with the radial plane of the novel wheel and tire assembly and being rotatable about said longitudinal axis for the purpose of adjusting the angularity of the adjacent end portions 72 and 74 of the tire segment elements for the purpose of increasing or decreasing the relative bite of the transverse tread portion defined by the adjacent edges of the tire segment elements with respect to the radial plane of the wheel and tire assembly. In this regard, by properly adjusting the angular tread portion of the wheel and tire assemblies on opposite sides of a vehicle i. e. adjusting said tread assemblies in opposition to each other on the different sides of the vehicle, the novel wheel and tire assembly will tend to maintain the vehicle in its longitudinal path of travel on a surface over which it is running similar to that of angular tread portions or angular lugs on tractor wheels.

It will be noted that the clamp block element 36 may be constructed of a suitable resilient material, a suitable hard rubber, for example, permitting the clamping engagement of the mounting shaft portion 68 of the tire segment elements. The portion 68 of the tire segment elements will have inserted longitudinally therein a core element 73 which permits the aforementioned clamping engagement of the clamp assemblies and prevents collapse of the mounting portion 68 of the tire segment elements, said core element 73 being centrally bored at 75 and incorporating therein a suitable inflation valve assembly 76.

In addition to affording an angularly adjustable transverse tread on the wheel and tire assembly, inasmuch as each of the tire segment elements are independently inflated, the puncturing of one will fail to materially impair the support characteristics of the wheel and tire assembly and accordingly a vehicle may be operated with one of the tire segment elements punctured until the same can be suitably repaired.

Thus, there has been disclosed a novel wheel and tire assemly which fully conforms with the objects of invention heretofore set forth.

Various positional directional terms such as "inner," "outer," etc., are utilized herein and have only a relative connotation to aid in describing the device and it is not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed as new is as follows:

1. In a wheel and tire assembly providing an adjustable tread for different road conditions such as mud, snow, and the like, an annular mounting member including means thereon for securement on a vehicle axle, a plurality of clamp assemblies radially disposed in equidistant relationship on said mounting member on the radial plane of the wheel and tire assembly, and a plurality of tire segment elements including a mounting shaft portion rotatably secured in longitudinal alignment with the radial plane of the wheel and tire assembly, said tire segment elements extending in radially spaced relationship about the annular mounting member and including arcuate crown portions combining to define an annular bearing surface portion, adjacent side portions of the tire segment elements defining angularly adjustable transverse tread portions in the annular bearing surface portion of said wheel and tire assembly adjustable about the clamp assemblies in angular relationship relative to the radial plane of the wheel and tire assembly.

2. In a wheel and tire assembly providing an adjustable tread for different road conditions such, as mud, snow, and the like, an annular mounting member including means thereon for securement on a vehicle axle, a plurality of clamp assemblies radially disposed in equidistant relationship on said mounting member on the radial plane of the wheel and tire assembly, and a plurality of tire segment elements including a mounting shaft portion rotatably secured in longitudinal alignment with the radial plane of the wheel and tire assembly, said tire segment elements extending in radially spaced relationship about the annular mounting member and including arcuate crown portions combining to define an annular bearing surface portion, adjacent side portions of the tire segment elements defining angularly adjustable transverse tread portions in the annular bearing surface portion of said wheel and tire assembly adjustable about the clamp assemblies in angular relationship relative to the radial plane of the wheel and tire assembly, said tire segment elements each comprising a hollow resilient inflatable body member, and an inflating valve assembly extending longitudinally through the mounting shaft portions of said tire segment elements.

3. In a wheel and tire assembly providing an adjustable tread for different road conditions such as mud, snow, and the like, an annular mounting member including means thereon for securement on a vehicle axle, a plurality of clamp assemblies radially disposed in equidistant relationship on said mounting member on the radial plane of the wheel and tire assembly, and a plurality of tire segment elements including a mounting shaft portion rotatably secured in longitudinal alignment with the radial plane of the wheel and tire assembly, said tire segment elements extending in radially spaced relationship about the annular mounting member and including arcuate crown portions combining to define an annular bearing surface portion, adjacent side portions of the tire segment elements defining angularly adjustable transverse tread portions in the annular bearing surface portion of said wheel and tire assembly adjustable about the clamp assemblies in angular relationship relative to the radial plane of the wheel and tire assembly, said clamp assemblies comprising a clamp block element including a transverse concave notch portion disposed at one side of the mounting shaft portions of the tire segment elements, an opposite side portion of said clamp block elements being juxtaposed on the mounting member, a clamp strap element including an intermediate arcuate portion circumposed on the opposite side of the mounting shaft portions of the tire segment elements, and mounting bolt assemblies extending transversely through the mounting member, clamp block and clamp strap elements on opposite sides of the mounting shaft portions for adjustably retaining the tire segment elements in a fixed position.

4. In a wheel and tire assembly providing an adjustable tread for different road conditions such as mud, snow, and the like, an annular mounting member including means thereon for securement on a vehicle axle, a plurality of clamp assemblies radially disposed in equidistant relationship on said mounting member on the radial plane of the wheel and tire assembly, and a plurality of tire segment elements including a mounting shaft portion rotatably secured in longitudinal alignment with the radial plane of the wheel and tire assembly, said tire segment elements extending in radially spaced relationship about the annular mounting member and including arcuate crown portions combining to define an annular bearing surface portion, adjacent side portions of the tire segment elements defining angularly adjustable transverse tread portions in the annular bearing surface portion of said wheel and tire assembly adjustable about the clamp assemblies in angular relationship relative to the radial plane of the wheel and tire assembly, said clamp assemblies comprising a clamp block element including a transverse concave notch portion disposed at one side of the mounting shaft portions of the tire segment elements, an opposite side portion of said clamp block elements being juxtaposed on the mounting member, a clamp strap element including in intermediate arcuate portion circumposed on the opposite side of the mounting shaft portions of the tire segment elements, and mounting bolt assemblies extending transversely through the mounting member, clamp block and clamp strap elements on opposite sides of the mounting shaft portions for adjustably retaining the tire segment elements in a fixed position, said mounting shaft portions of the tire segment elements including an annular end flange portion overlying the clamp block and clamp strap elements, and a central core element longitudinally disposed in the mounting shaft portions, said core elements including a longitudinal bore portion therethrough, and an inflation valve assembly removably received in the longitudinal bore portion of the core elements.

5. In a wheel and tire assembly providing an adjustable tread for different road conditions such as mud, snow and the like, a mounting member including means thereon for securement on a vehicle axle, a plurality of clamp assemblies radially disposed on said mounting member on the radial plane of the wheel and tire assembly, and a plurality of tire segment elements including a mounting shaft portion rotatably secured in longitudinal alignment with the radial plane of the wheel and tire assembly, said tire segment elements extending in radially spaced relationship about the mounting member and including crown portions combining to define an annular bearing surface portion, adjacent side portions of the tire segment elements defining angularly adjustable transverse tread portions in the bearing surface portion of said wheel and tire assembly adjustable about the clamp assemblies in angular relationship relative to the radial plane of the wheel and tire assembly.

6. In a wheel and tire assembly providing an adjustable tread for different road conditions such as mud, snow, and the like, a mounting member including means thereon for securement on a vehicle axle, clamp means radially disposed on said mounting member, and a plurality of tire segments including means rotatably supporting said tire segment elements in radially extending relationship from the clamp means, said tire segment elements extending in radially spaced relationship about the mounting member and including crown portions combining to define an annular bearing surface portion, adjacent side portions of the tire segment elements defining angularly adjustable transverse tread portions in the bearing surface portion of said wheel and tire assembly adjustable about the clamp means in angular relationship relative to the plane of rotation of the wheel and tire assembly.

References Cited in the file of this patent

UNITED STATES PATENTS

| 856,411 | Mains | June 11, 1907 |
| 1,202,991 | Girard | Oct. 31, 1918 |